(12) United States Patent
Felker (10) Patent No.: US 6,484,968 B2
(45) Date of Patent: Nov. 26, 2002

(54) AIRCRAFT WITH ELLIPTICAL WINGLETS

(76) Inventor: Fort F. Felker, 2233 Tuscany Cir., Livermore, CA (US) 94550

( * ) Notice: Subject to any disclaimer, the term of this patent is extended or adjusted under 35 U.S.C. 154(b) by 0 days.

(21) Appl. No.: 09/734,347

(22) Filed: Dec. 11, 2000

(65) Prior Publication Data

US 2002/0092947 A1 Jul. 18, 2002

(51) Int. Cl.⁷ .................................................. B64C 5/08
(52) U.S. Cl. .......................................... 244/91; 244/199
(58) Field of Search ................................... 244/199, 91

(56) References Cited

U.S. PATENT DOCUMENTS

| | | | |
|---|---|---|---|
| 4,017,041 A | 4/1977 | Nelson | 244/40 |
| 4,190,219 A | 2/1980 | Hackett | 244/199 |
| 4,205,810 A | 6/1980 | Ishimitsu | 244/91 |
| 4,240,597 A | * 12/1980 | Ellis et al. | |
| 4,245,804 A | 1/1981 | Ishitmitsu et al. | 244/91 |
| 4,605,183 A | * 8/1986 | Gabriel | |
| 4,674,709 A | * 6/1987 | Welles | |
| 4,714,215 A | 12/1987 | Jupp et al. | 244/199 |
| 5,102,068 A | * 4/1992 | Gratzer | |
| 5,275,358 A | * 1/1994 | Goldhammer et al. | |
| 5,348,253 A | * 9/1994 | Gratzer | |
| 5,407,153 A | 4/1995 | Kirk et al. | 244/199 |
| 5,961,068 A | * 10/1999 | Wainfan et al. | |

FOREIGN PATENT DOCUMENTS

JP  406144384  * 5/1994  ................. 244/91

* cited by examiner

*Primary Examiner*—Charles T. Jordan
*Assistant Examiner*—T. Dinh
(74) *Attorney, Agent, or Firm*—Delbert J. Barnard (57) ABSTRACT

An aircraft with swept back wings has winglets (202) at the outer ends of its wings (200). The winglets (202) curve upwardly as they extend outwardly from their intersection (204) with the wings (200). The curvature of the winglets (202) at least approximates a conical section curvature, e.g. an elliptical based on an ellipse having a major axis that extends vertically and coincides with the intersection (204) of the outer end of the wing (200) and the inner end of the winglet (202).

13 Claims, 8 Drawing Sheets

AIRCRAFT WITH ELLIPTICAL WINGLETS

TECHNICAL FIELD

This invention relates to winglets adapted to reduce the induced drag created by an aircraft's wings when they create lift. More particularly, it relates to the provision of a winglet that is continuously curved from where it joins the outer end of the wing out to its outer end or tip and the curvature at least closely approximates the curvature of a conical section, viz. has elliptical, parabolic or hyperbolic curvature.

BACKGROUND OF THE INVENTION

Lifting surfaces (wings) create drag when they create lift. This drag-due-to-lift is called "induced drag." Aerodynamic theory shows that for essentially planar wings (wings that line essentially in the x-y plane), that the induced drag is minimized if the lift on the wing is distributed elliptically along the span of the wing. That is, the lift per unit span as a function of spanwise position should vary elliptically, with the largest lift per unit span at the wing centerline, and with the lift per unit span gradually dropping in an elliptical manner as the tip is approached. This theoretical result is well known, and many aircraft wings have been constructed with elliptical wing planforms to ensure that the lift does, in fact, vary in an elliptical fashion. The British Spitfire is a classic example of an aircraft wing constructed in an elliptical shape to take advantage of this theoretical result.

The purpose and operation of "winglets" is described in "Aerodynamics, Aeronautics and Flight Mechanics", by Barnes W. McCormick, and published 1979 by John Wiley & Sons, Inc. (pages 215–221). Known winglet constructions in the patent literature are disclosed by U.S. Patents: No. 4,017,041, granted Apr. 12, 1977 to Wilbur C. Nelson; No. 4,190,219, granted Feb. 26, 1980, to James E. Hackett; No. 4,205,810, granted Jun. 3, 1980, to Kichio K. Ishimitsu; No. 4,240,597, granted Dec. 23, 1990, to Roger R. Ellis, W. Martin Gertsen and Norman E. Conley; No. 4,245,804, granted Jan. 20, 1981, to Kichio K. Ishimitsu and Neal R. Van Devender; No. 4,714,215, granted Dec. 22, 1987, to Jeffrey A. Jupp and Peter H. Rees; No. 5,275,358, granted Jan. 4, 1994 to Mark I. Goldhammer and Karela Schippers; No. 5,348,253, granted Sep. 20, 1994 to Lewis B. Gratzer and No. 5,407,153, granted Apr. 18, 1995 to Phillip S. Kirk and Richard Whitcomb.

Figure 1:
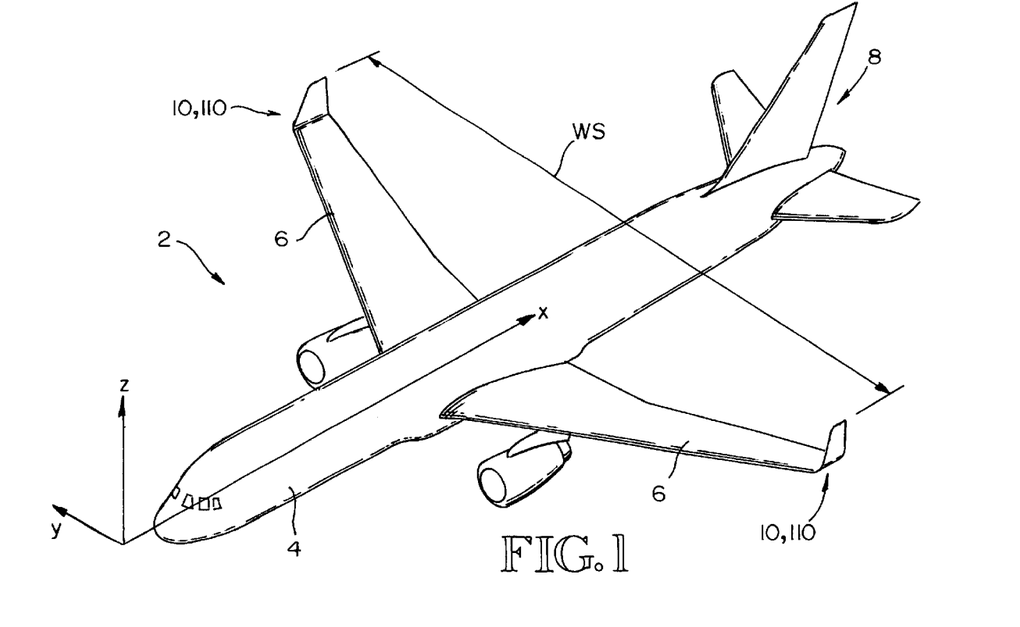
FIG. 1 is a pictorial view taken from above and looking towards the front, top and one side of an airplane that includes winglets on its wings, such view also constituting FIG. 1 of the aforementioned U.S. Pat. No. 5,275,358.

FIGS. 1–4 of the drawing are identical to FIGS. 1, 2, 4 and 11 in U.S. Pat. No. 5,275,358. Referring to FIG. 1, the aircraft (2) basically comprises an aircraft body (4), left and right wings (6), and a tail section (8). A winglet (10, 110) is shown at the outer end of each wing (6). A coordinate system is defined for the aircraft (2) in the following manner. A longitudinal axis (x) is defined to extend through the center of w the aircraft body (4) in the fore and aft directions. Further, a vertical axis (z) is defined in the up and down directions, while a transverse axis (y) is defined in the left and right directions. The longitudinal axis (x), vertical axis (z) and transverse axis (y) are orthogonal to each other and meet at an origin located at the foremost plane of the aircraft (2).

Figure 2:
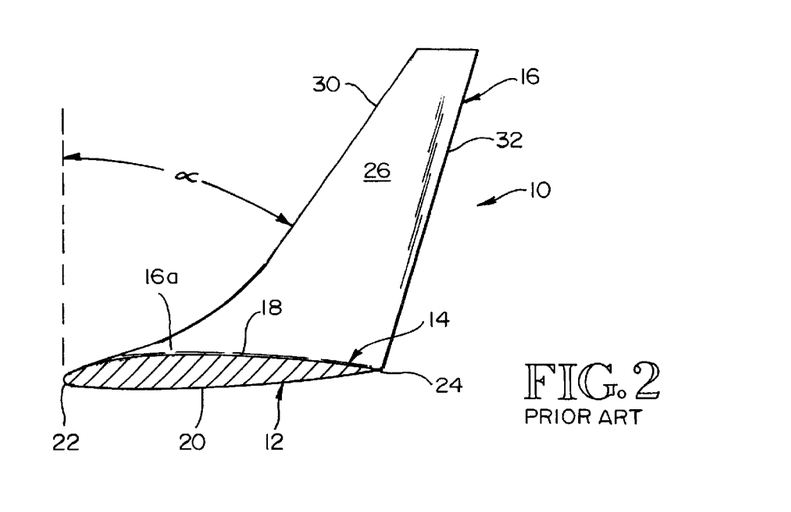
FIG. 2 is a cross sectional view taken through the right wing of FIG. 1, showing the main wing span in section and sending a side elevational view of a winglet, such view also constituting FIG. 2 of U.S. Pat. No. 5,275,358.
Figure 3:
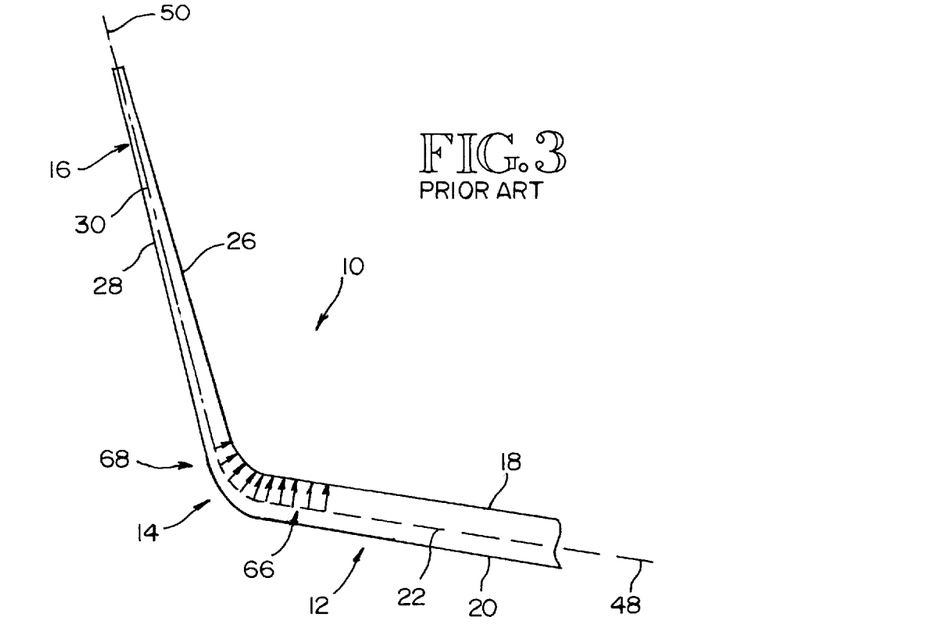
FIG. 3 is a fragmentary front elevational view of the winglet of FIG. 2 and enjoining portion of the main span of the wing, such view also constituting FIG. 4 of U.S. Pat. No. 5,275,358.

Referring to FIGS. 2 and 3, a winglet (16), which is generally trapezoidal in shape, is joined to the wingtip (12) so that the winglet (16) upwardly extends from the wing (6). A strake is indicated by reference character (16a) in FIG. 2. The wing (12) (FIG. 2) has upper and lower wing surfaces (18) and (20), a wing leading edge (22), and a wing trailing edge (24). Similarly, the winglet (16) has upper and lower winglet surfaces (26) and (28), a winglet leading edge (30), a winglet trailing edge (32), and a wing/winglet intersection (14). Conventionally, the terms "upper" and "lower" used in reference to the winglet (16) generally corresponds to the "inner" and "outer" directions, respectively. This convention will be followed herein. The winglet (16) is swept back at an angle ($\alpha$) from the vertical z-axis at least equal to the sweep angle of the leading edges of the wings at the wing tip (14) relative to the transverse y-axis (FIG. 2). The winglet (16) is also canted at a cant angle from a plane parallel to the (x) and (y) axis (FIG. 3). Two methods of defining the curvature of the aft portions of the air foils of the wing (12) and winglet (16) are set forth in U.S. Pat. No. 5,275,358, commencing in column 4, at line 7, and continuing into column 5.

Figure 4:
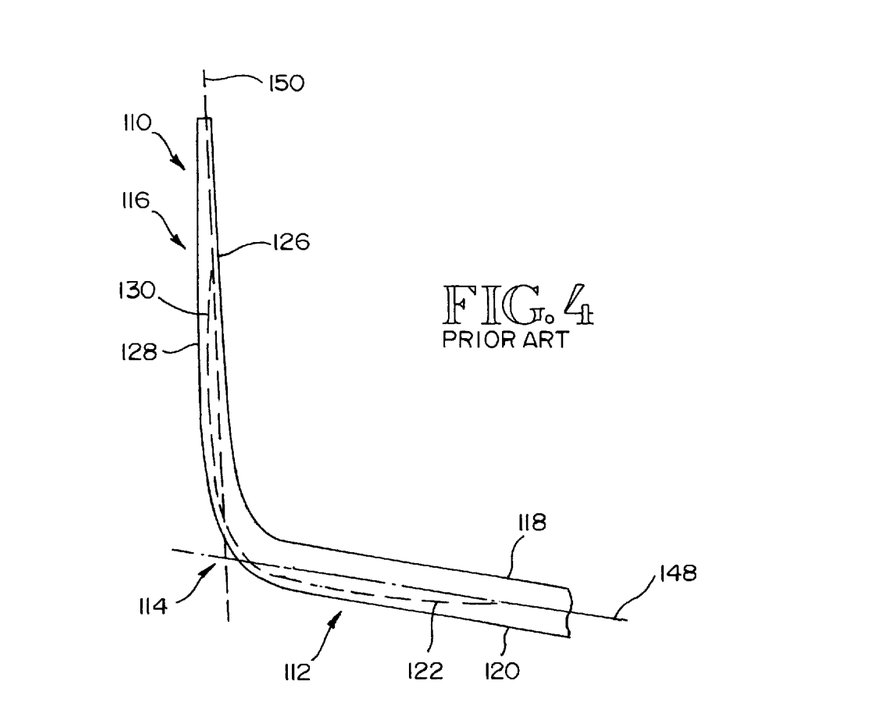
FIG. 4 is a view like FIG. 3, but of a different prior art winglet, such view also constituting FIG. 11 of U.S. Pat. No. 5,275,358.

FIG. 4 in the drawing is identical to FIG. 11 in U.S. Pat. No. 5,275,358. It is prior art to the present invention and constitutes the invention of Pat. No. 5,275,358. Referring to FIG. 4, the tip of the wing (6) is designated (112). Point (114) is where the wing reference plane (148) intersects the winglet reference plane (150). The winglet (116) is generally trapezoidal in shape. It extends upwardly from the wing tip (112) and the inner section (114). The wing tip (112) has upper and lower wing surfaces (118 and 120), a wing leading edge (122) and a wing trailing edge. The winglet (116) has upper and lower winglet surfaces (126 and 128), a winglet leading edge (130), a winglet trailing edge and a winglet root. Generally, the wing/winglet configuration (110) of U.S. Pat. No. 5,275,358 (FIG. 4) has three primary features. Firstly, the aft portion of the upper wing and winglet surfaces (118 and 129) are flattened to prevent flow separation at the wing/winglet intersection (114). Secondly, the wing and winglet leading edges (122 and 130) are drooped downwardly to prevent premature shockwave development. Thirdly, the winglet (116) is not canted outwardly, so the wing bending moments are not substantially increased by the addition of the winglet (116). These primary features and certain secondary features are described in detail in U.S. Pat. No. 5,275,358.

Figure 5:
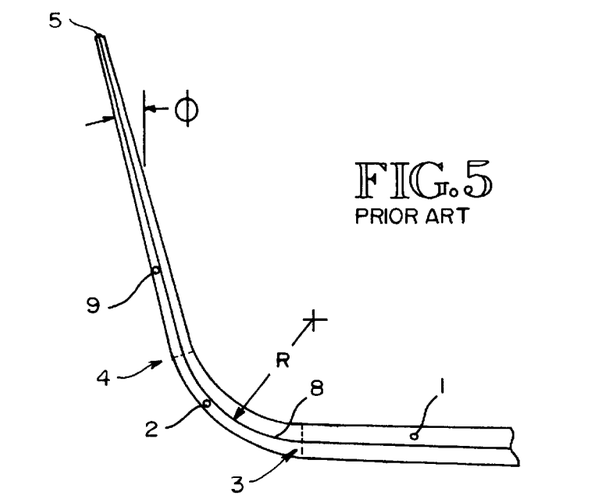
FIG. 5 is a view like FIGS. 3 and 4 but of yet another prior art winglet, such view also constituting FIG. 1B of U.S. Pat. No. 5,348,253.

FIG. 5 of the drawing is identical to FIG. 1B of U.S. Pat. No. 5,348,253. Referring to FIG. 5, what is referred to as "a blended winglet" is shown connected to a typical wing end portion (1). The winglet chord equals the wing tip chord at the attachment line (3). A transition section (2) is bounded by the transition line (3) and a chordwise line (4) designating the transition end of the winglet (9). The nearly planar outer portion of the winglet (9) is generally straight from the transition end (4) to the tip (5). A first feature of the FIG. 5 wing/winglet arrangement is a continuous monotonic chord variation bounded by a leading edge curve and a trailing edge curve (8). These curves are tangent to the wing leading edge and trailing edge respectively at the winglet attachment line (3) and are also tangent to the leading edge and trailing edges respectively of the straight section (9) at line (4). The leading edge curve (7) is selected to provide a smooth gradual chord variation in the transition and also, to limit the leading edge sweep angle to less than about 65°. This is necessary to avoid vortex shedding from the leading edge which would comprise the surface loading and thereby increase drag. The shape of the trailing edge curve (8) is generally not critical but is selected to correspond to the airfoil chord and twist required to achieve optimum loading. This restriction will usually allow the wing and winglet trailing edges to lie in the same plane which is desirable functionally and esthetically.

The second feature is a continuous monotonic variation of cant angle. It is stated that the rate of curvature R must be large enough to accommodate the chord variation in the transition section and allow the practical achievement of optimum aerodynamic loading and minimum interference between wing and winglet. The radius and curvature criteria is given below in terms of a parameter, $K_r$ having fairly narrow limits:

$$\frac{R}{h} = K_R \cos\left(\frac{\phi_4}{2} + \frac{\pi}{4}\right) / \cos\phi_4; 35 < K_R < .50$$

where,
- h=winglet height measured along a normal to the wing chord plane
- $\phi_4$=cant angle of the planar section
- $\Lambda_H$=maximum sweep angle of the leading edge curve 7
- $K_R$=curvature parameter (select lower limit if practical)

More details respecting the winglet curvature are set forth in U.S. Pat. No. 5,348,253.

BRIEF SUMMARY OF THE INVENTION

The present invention includes the discovery that when winglets are attached to the wing tips, the minimum induced drag is obtained when the lift is distributed in a generally elliptical fashion both in the spanwise and vertical directions. The present invention utilizes winglets having a generally elliptical shape in the z-y plane, assuring that the wing loading closely approximates the ideal lift distribution. This results in minimum induced drag and reduced fuel consumption. The present invention also includes the discovery that the winglets will provide reduced induced drag when the winglets have a generally parabolic shape or a generally hyperbolic shape in the y-z plane.

The present invention includes providing the wings of an aircraft with winglets of a unique curvature. Each wing has an inner end, an outer end, an upper surface, a lower surface, a leading edge and a trailing edge. Each winglet has an inner end, an outer end, an upper surface, a lower surface, a leading edge and a trailing edge. The inner end of each winglet is connected to the outer end of its wing. The upper and lower surfaces of the winglets and the leading and trailing edges of the winglets are continuations of the upper and lower surfaces of the wing and the leading and trailing edges of the wing. Each winglet follows a generally elliptical curve as it extends from its inner end out to its outer end. The generally and said elliptical curve has a major axis that extends substantially perpendicular to the wing reference plane and substantially intersects the location where the outer end of the wing is joined to the inner end of the winglet.

In preferred form, the generally elliptical curve has a minor axis substantially perpendicular to the major axis, and that is spaced above the outer end of the winglet. The minor axis intersects the major axis at a center and a diagonal line extends from the center out to the outer end of the winglet and makes an acute angle of about forty-five to ninety (45°–90°) degrees with the major axis.

In preferred form, at its outer end the winglet has a cant angle of substantially about forty-five to about ninety degrees (45°–90°).

In preferred form, each wing has a dihedral angle of substantially about zero to fifteen degrees (0°–15°).

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and.

DETAILED DESCRIPTION OF THE INVENTION

The aircraft shown by FIG. 1 includes winglets 10, 110 which are representative of both the prior art winglets and the winglets of the present invention. The prior art winglets shown by FIGS. 2–5 have been described above. The winglets of the present invention will now be described with respect to FIGS. 6–11.

Figure 6:
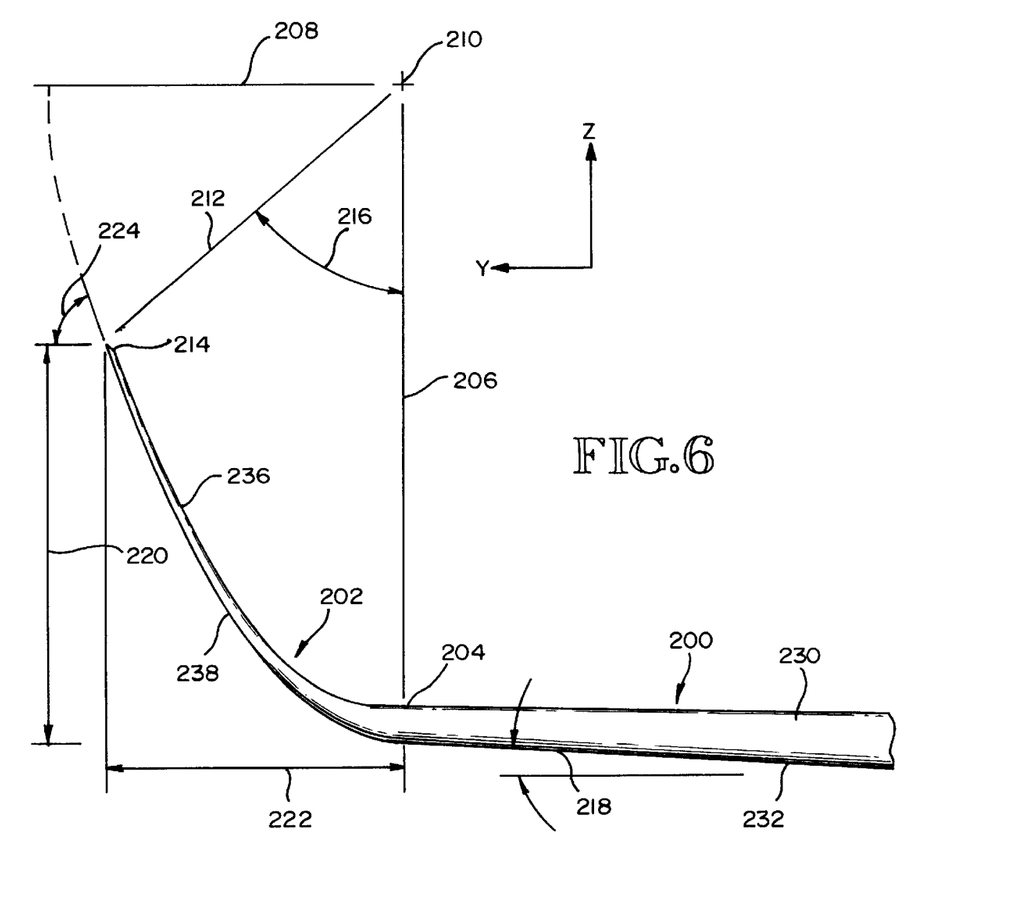
FIG. 6 is a view like FIGS. 3–5, but of a winglet constructed in accordance with the present invention.

Referring first to FIG. 6, showing an embodiment of the invention, the outer end of the wing 200 meets the inner end of the winglet 202 at intersection 204. The major axis 206 of an ellipse is shown to extend perpendicular to the wing reference plane and to coincide with the intersection 204. The minor axis 208 of the ellipse extends perpendicular to the major axis and intersects the major axis at center 210. If one were to draw a diagonal line 212 from the center 210 to the outer end or tip 214 of the winglet 202, an acute angle 216 would be defined between the line 212 and the major axis 206. In FIG. 6, the dihedral angle of the wing 200 is designated 218. The winglet height is designated 220 and the winglet span is designated 222. The wing tip cant angle is designated 224. According to the invention, the winglet 202 curves upwardly and outwardly from intersection 204 to the outer end or tip 214 of the winglet 202.

A cross sectional view taken at intersection 204 and looking outwardly towards the winglet 202 in elevation would look substantially like FIG. 2. The winglet 202 has a generally trapezoidal shape in side elevation (FIG. 7) and the leading edge makes an angle α with a vertical line, as best shown in FIG. 2.

The winglet 202 preferably has a curvature in the y-z plane that at least approximates a sector of an ellipse measured from intersection station 204 outwardly to the winglet outer end or tip 214. At intersection station 204, the curvature of the winglet surfaces meets the wing surfaces substantially at a tangent. As the winglet 202 extends outwardly from intersection station 204, its curvature in the y-z plane changes in substantially the same way that an elliptical surface changes. The elliptical sector is identified in FIG. 10, between major axis 204 and point 214 representing the position of the winglet tip 214 on the ellipse.

Figures 7, 12:
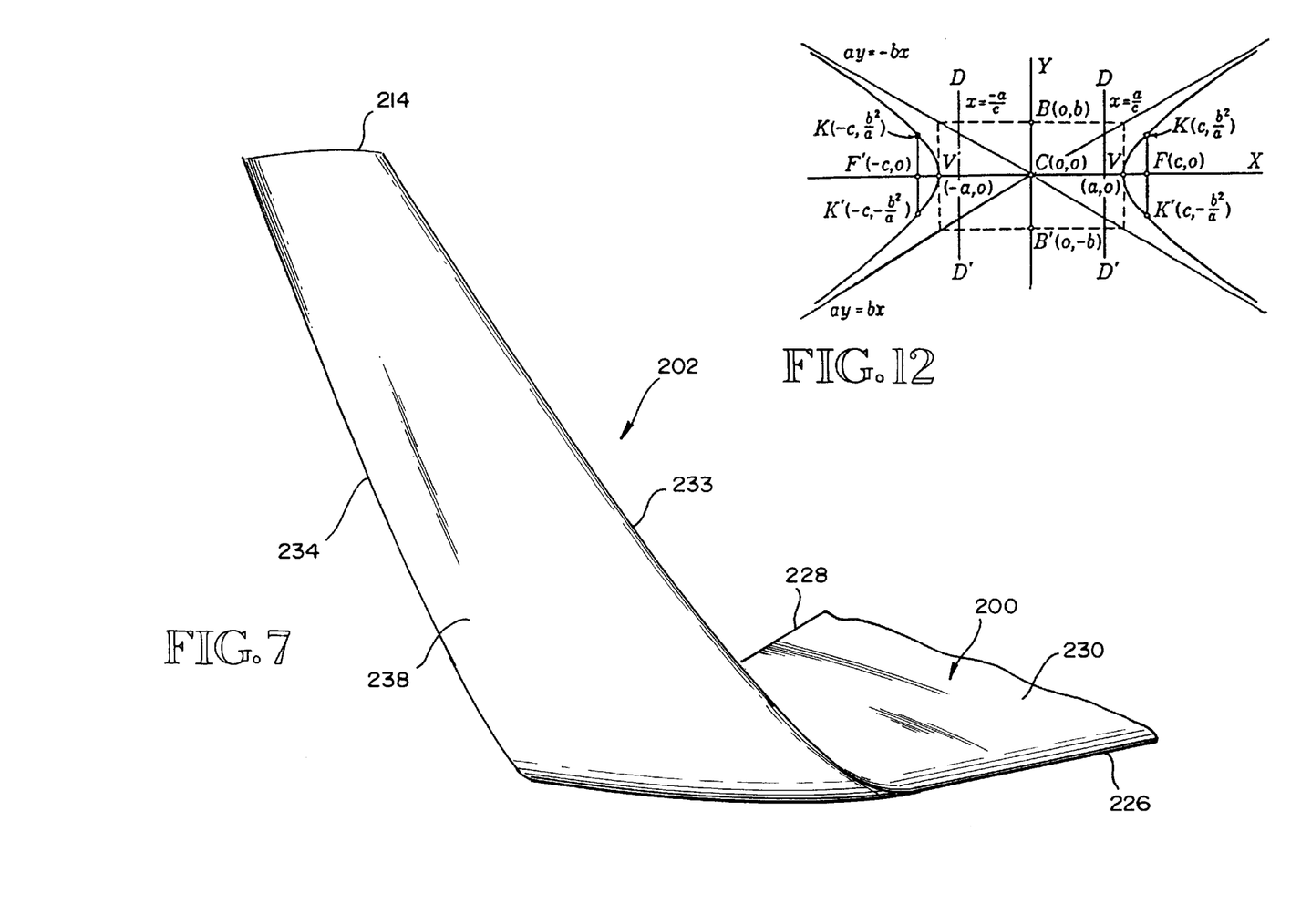
FIG. 7 is a fragmentary pictorial view of the winglet shown by FIG. 6, looking towards its forward edge and lower surface.
FIG. 12 is a drawing of a hyperbola taken from the same geometry text as FIGS. 10 and 11.
Figure 8:
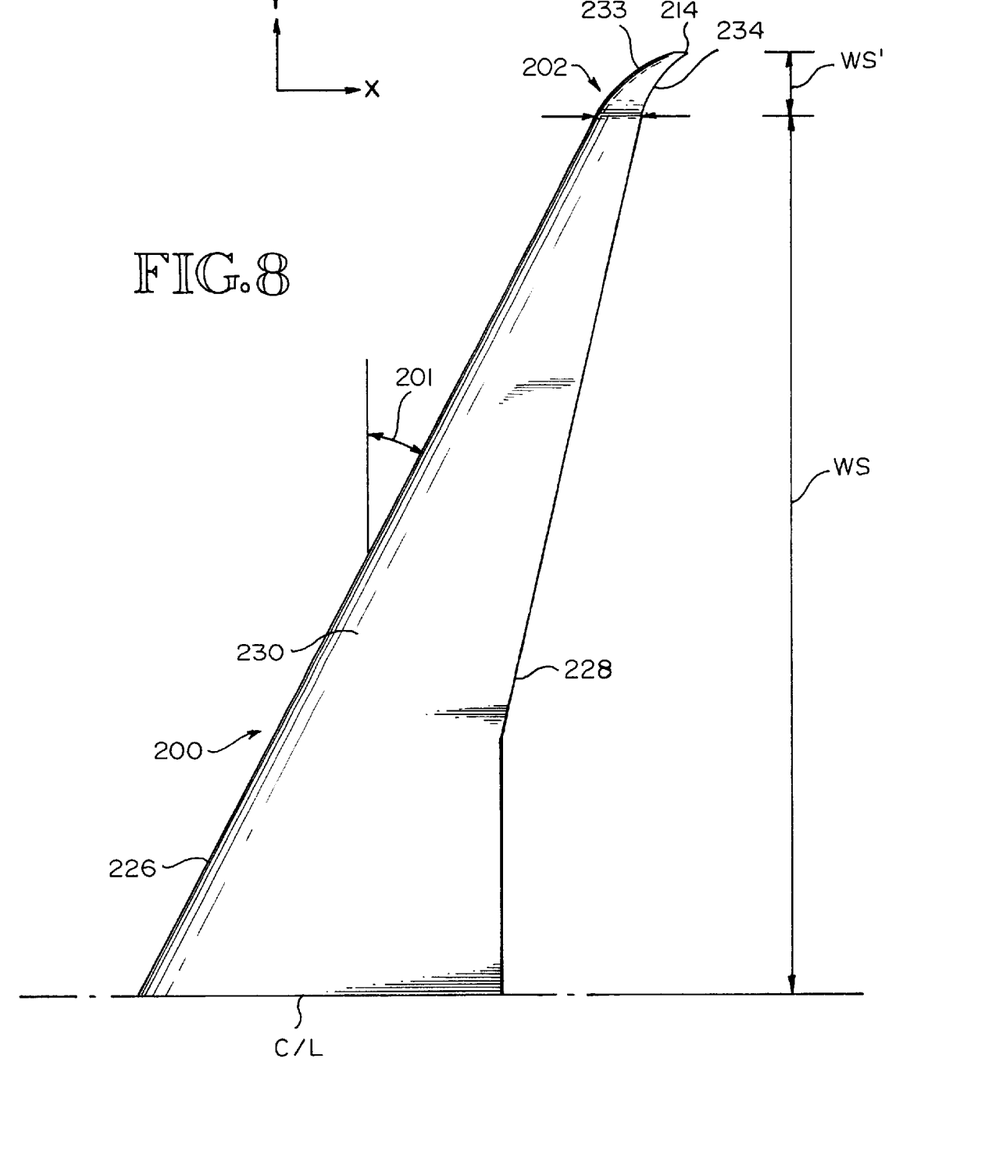
FIG. 8 is a top plan view of a wing for a MD-80 with winglets.

Referring to FIGS. 6–8, the wing 200 has a forward edge 226, a rearward or trailing edge 228, an upper surface 230 and a lower surface 233 (FIG. 6). The winglet 202 has a forward edge 232, a rearward edge 234, an upper surface 236 (FIG. 6) and a lower surface 238. As best shown by FIGS. 6 and 7, the upper and lower surfaces 236, 238 of the winglet 202, and the leading and trailing edges 232, 234 of the winglet 202, are continuations of the upper and lower surfaces 230, 232 and the leading and trailing edges 226, 228 of the wing 200.

Referring to FIG. 8, the wing 200 has a sweep angle 201. The wingspan extending from the aircraft centerline C/L out to where the wing 200 meets the winglet 202 is designated WS. The span of the winglet is designated WS'. The distance WS is smaller and the distance WS' is larger than it is in the prior art aircraft. This results in reduced induced drag.

Figures 9, 10, 11:
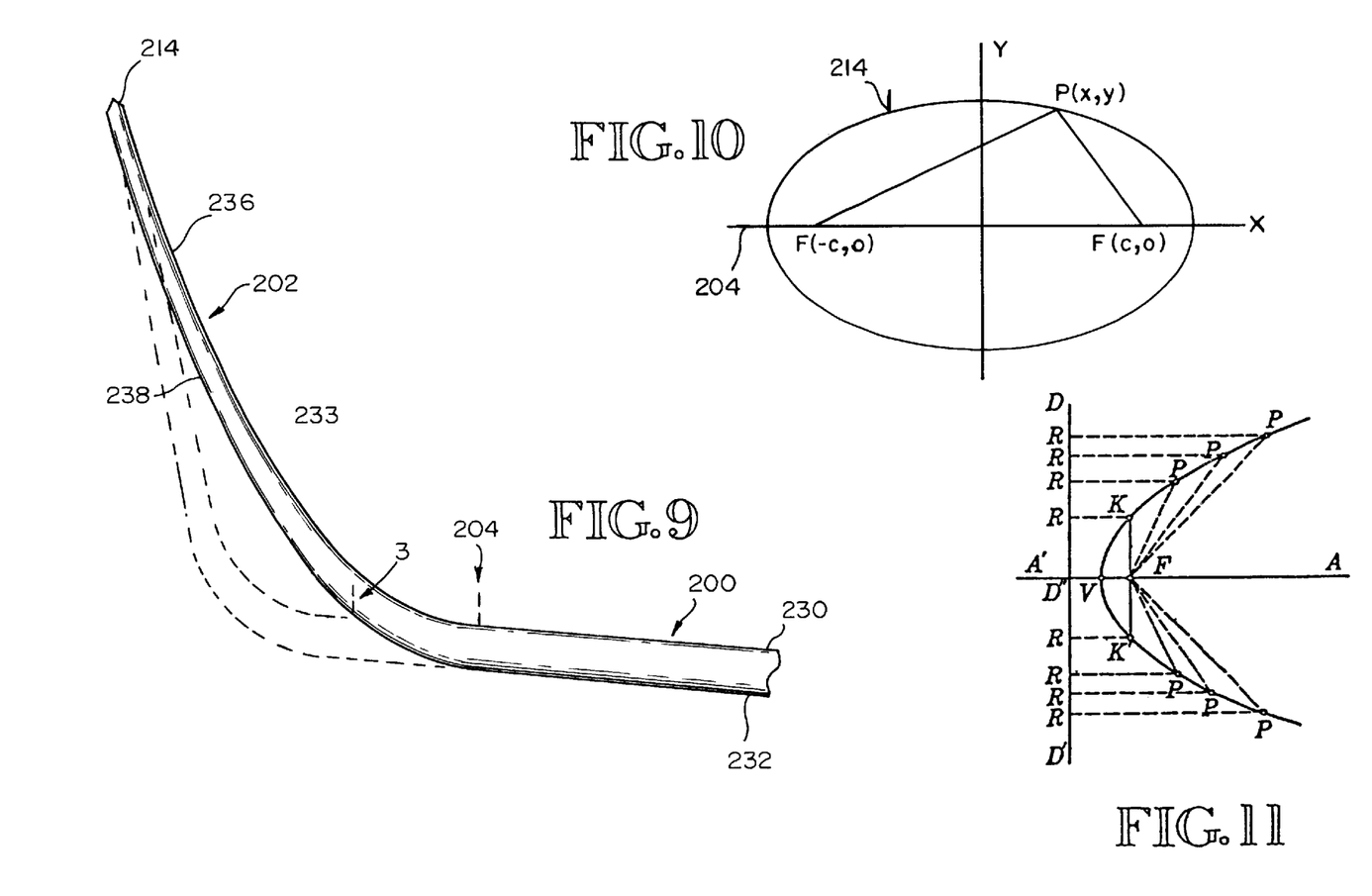
FIG. 9 is a view that combines FIGS. 5 and 6, such view showing the FIG. 5 winglet in broken lines and showing the FIG. 6 winglet in solid lines.
FIG. 10 is a drawing of an ellipse taken from a geometry text.
FIG. 11 is a drawing of a parabola taken from the same geometry text as FIG. 10.

The invention differs from all prior art winglet designs in two important aspects. First, in preferred form, the present design closely follows the ideal elliptical shape, while no prior winglet follows the ideal elliptical shape, or even attempts to approximate it. The other conic sections, viz. a parabolic section and a hyperbolic section, include curves that approximate the ideal elliptical shape and thus they are included in the invention. These curves are shown by FIGS. 11 and 12.

Figure 13:
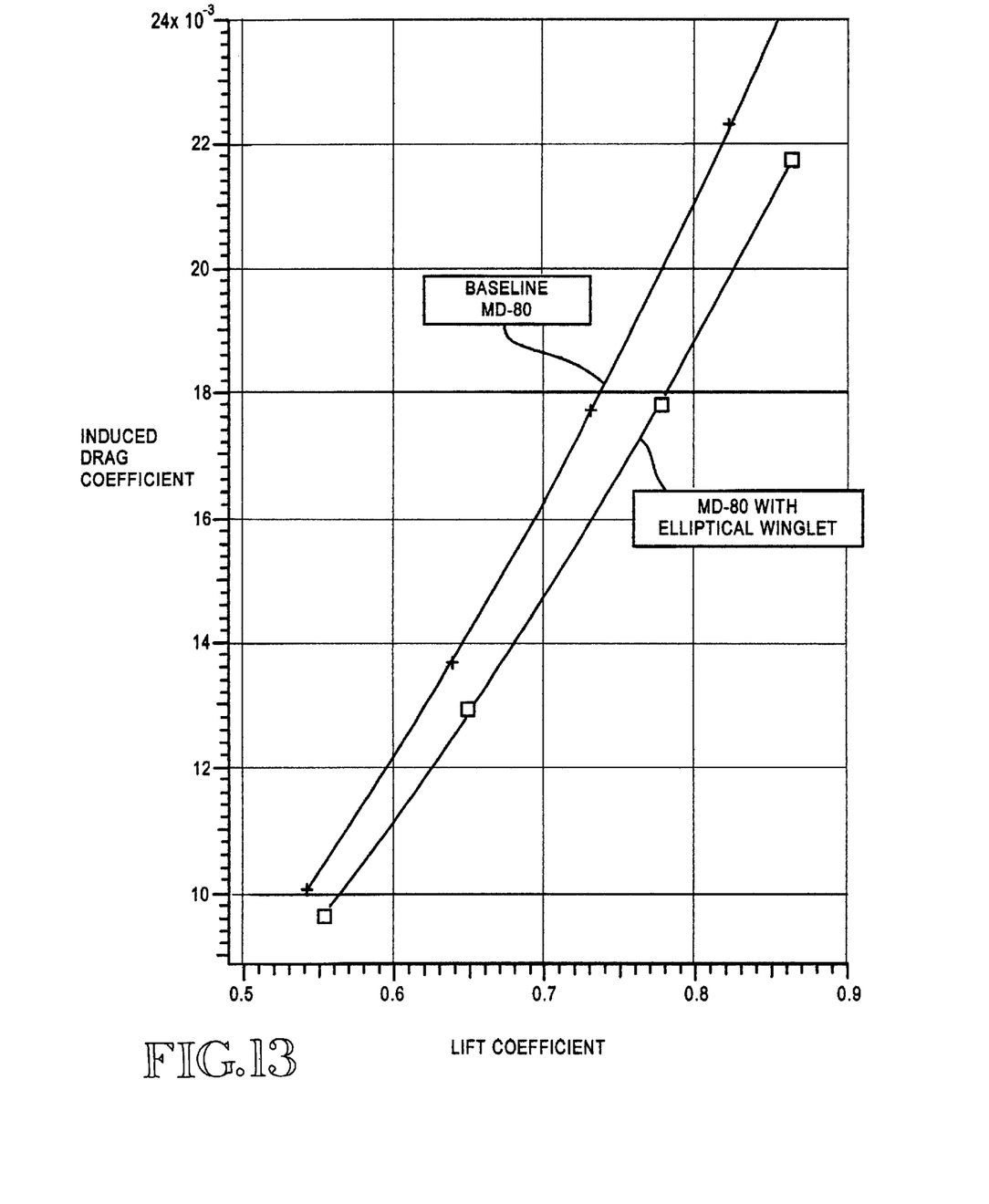
FIG. 13 is a graph plotting induced drag coefficient with lift coefficient.

FIG. 13 is a graph plotting induced drag coefficient with lift coefficient. This graph shows that the elliptical winglet of the present invention reduces induced drag on the MD-80 aircraft by ten percent (10%). It is believed that a near elliptical curvature and parabolic and hyperbolic curvatures will also significantly reduce induced drag. Second, the present design is continuously curved in the y-z plane (front view), while all prior winglets have an essentially planar winglet shape when viewed from the front, perhaps with a brief curved transition section between the wing and the winglet. Owing to the conical section nature of the winglet curvature in the y-z plane, the radius of curvature is at a minimum at 204 where the outer end of the wing 200 meets the inner end of the winglet 202. As the winglet 202 extends outwardly from intersection 204, the radius of curvature progressively and continuously increases following generally at least a conical section curvature and preferably following an elliptical curvature.

Figure 14:
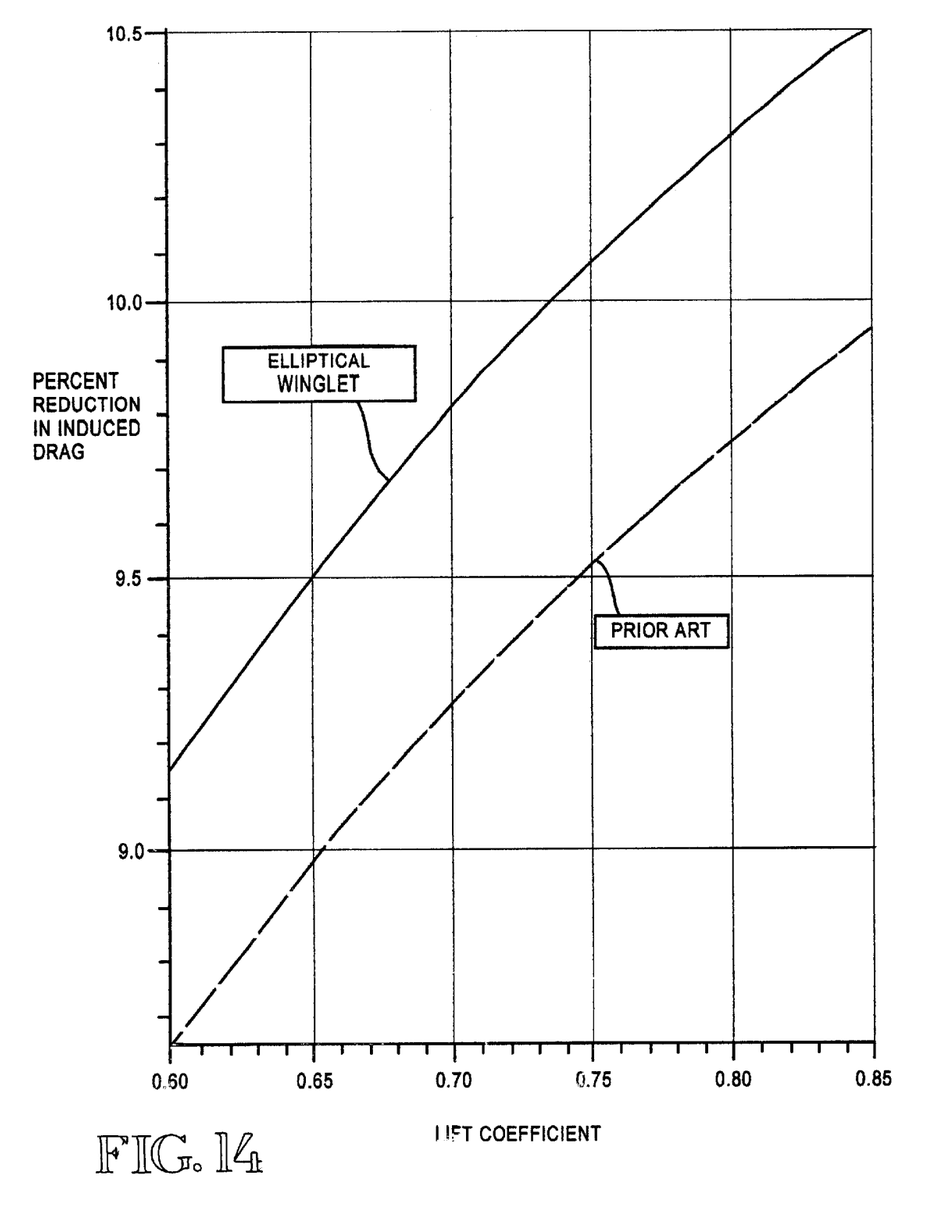
FIG. 14 is a graph plotting percentage in reduction in induced drag versus lift coefficient showing the improvement obtained with the elliptical winglet in comparison to the prior art.

The superior performance of the elliptical winglet design in comparison to the prior art is illustrated in FIG. 14. This figure shows the percentage reduction in induced drag obtained when an MD-80 aircraft is fitted with an elliptical winglet, and a winglet designed in conformance with Pat. No. 5,348,253. The figure shows that the elliptical winglet reduces the MD-80 induced drag by approximately ½ percent in comparison to the prior art. This ½ percent reduction in induced drag would result in an annual fuel cost savings of approximately $15,000 for an MD-80 in commercial airline service, based on a fuel cost of approximately $0.90 per gallon. This savings clearly illustrates the value of the elliptical winglet described in this patent.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. An aircraft, comprising:
   a wing having an inner end, an outer end, an upper surface, a lower surface, a leading edge, and a trailing edge; and
   a winglet having an inner end, an outer end tip, an upper surface, a lower surface, a leading edge and a trailing edge;
   wherein the inner end of said winglet is connected to the outer end of said wing;
   wherein the upper and lower surfaces of the winglet and the leading and trailing edges of the winglet are continuations of the upper and lower surfaces of the wing and leading and trailing edges of the wing;
   wherein said winglet curves as it extends from its inner end out to its outer end tip and said curve has an increasing radius as it extends from the inner end of the winglet out to the outer end tip of the winglet; and
   wherein the curve that is followed by the winglet is from the group of curves consisting of a generally elliptical curve, a generally parabolic curve and a generally hyperbolic curve.

2. The aircraft of claim 1, wherein the winglet follows a generally elliptical curve as it extends from its inner end out to its outer end tip.

3. The aircraft of claim 1, wherein the winglet follows a generally parabolic curve as it extends from its inner end out to its outer end tip.

4. The aircraft of claim 1, wherein the winglet follows a generally hyperbolic curve as it extends from its inner end out to its outer end tip.

5. An aircraft, comprising:
   a wing having an inner end, an outer end tip, an upper surface, a lower surface, a leading edge, and a trailing edge; and
   a winglet having an inner end, an outer end, an upper surface, a lower surface, a leading edge and a trailing edge;
   wherein the inner end of said winglet is connected to the outer end of said wing;
   wherein the upper and lower surfaces of the winglet and the leading and trailing edges of the winglet are continuations of the upper and lower surfaces of the wing and the leading and trailing edges of the wing; and
   wherein said winglet follows a generally elliptical curve as it extends from its inner end out to its outer end tip and said elliptical curve has a major axis that extends substantially perpendicular to the wing reference plane and substantially intersects the location where the outer end of the wing is joined to the inner end of the winglet.

6. The aircraft of claim 5, wherein the generally elliptical curve has a minor axis that is substantially perpendicular to the major axis and is spaced above the outer end tip of the winglet.

7. The aircraft of claim 6, wherein the minor axis intersects the major axis at a center, and a diagonal line extending from the center out to the outer end tip of the winglet and makes an acute angle of about 45–90 degrees with the major axis.

8. The aircraft of claim 5, wherein at its outer end tip the winglet has a cant angle of substantially about 45–90 degrees.

9. The aircraft of claim 5, wherein the wing has a dihedral angle of substantially about 0–15 degrees.

10. The aircraft of claim 9, wherein the elliptical curve has a minor axis that is perpendicular to the major axis and is spaced above the outer end tip of the winglet.

11. The aircraft of claim 10, wherein the minor axis intersects the major axis at a center, and a diagonal line extending from the center to the outer end tip of the winglet would make an acute angle of about 45–90 degrees from the major axis.

12. The aircraft of claim 10, wherein the winglet has a cant angle or about 45–90 degrees substantially at its outer end tip.

13. The aircraft of claim 12, wherein the minor axis intersects the major axis at a center, and a diagonal line extending from the center to the outer end tip of the winglet would make an acute angle of about 45–90 degrees from the major axis.

* * * * *